(12) United States Patent
Teply et al.

(10) Patent No.: US 11,979,704 B2
(45) Date of Patent: May 7, 2024

(54) SPEAKER UTILIZING VOICE COIL FOR WIRELESS CHARGING

(71) Applicant: STMICROELECTRONICS DESIGN AND APPLICATION S.R.O., Prague (CZ)

(72) Inventors: Tomas Teply, Hloubetin (CZ); Karel Blaha, Plzen (CZ)

(73) Assignee: STMICROELECTRONICS DESIGN AND APPLICATION S.R.O., Prague (CZ)

( * ) Notice: Subject to any disclaimer, the term of this patent is extended or adjusted under 35 U.S.C. 154(b) by 0 days.

(21) Appl. No.: 17/537,263

(22) Filed: Nov. 29, 2021

(65) Prior Publication Data

US 2023/0171529 A1    Jun. 1, 2023

(51) Int. Cl.
*H04R 1/10*    (2006.01)
*H04R 9/04*    (2006.01)
*H04R 9/06*    (2006.01)

(52) U.S. Cl.
CPC ......... *H04R 1/1025* (2013.01); *H04R 1/1075* (2013.01); *H04R 9/04* (2013.01); *H04R 9/06* (2013.01); *H04R 2420/07* (2013.01)

(58) Field of Classification Search
None
See application file for complete search history.

(56) References Cited

U.S. PATENT DOCUMENTS

| | | | |
|---|---|---|---|
| 7,548,040 B2 | 6/2009 | Lee et al. | |
| 8,073,172 B2 | 12/2011 | Sip | |
| 9,729,980 B2 | 8/2017 | Ku et al. | |
| 10,256,661 B1* | 4/2019 | Lu | H02J 7/342 |
| 2007/0032274 A1* | 2/2007 | Lee | H04R 1/1025 455/575.2 |
| 2013/0052947 A1* | 2/2013 | Kole | H04B 5/0031 455/41.1 |
| 2015/0108942 A1* | 4/2015 | Lin | H02J 50/10 320/108 |
| 2018/0227680 A1* | 8/2018 | Irish | H04R 1/1041 |

FOREIGN PATENT DOCUMENTS

| | | |
|---|---|---|
| CN | 203039881 U | 7/2013 |
| CN | 209517470 U | 10/2019 |

* cited by examiner

*Primary Examiner* — Walter F Briney, III
(74) *Attorney, Agent, or Firm* — Seed IP Law Group LLP

(57) ABSTRACT

The present disclosure is directed to a device that includes a headphone speaker housing that includes a coil having a first terminal and a second terminal that is configured to operate in a sound generation mode and a battery charging mode. A class D amplifier circuit is configured to rectify in a battery charging mode and amplify in a sound generation mode, the class D amplifier is coupled to the first terminal and the second terminal of the coil. The class D amplifier including a first, second, third, and fourth switch, the first terminal coupled between the first and second switch, the second terminal coupled between the third and fourth switch. An audio generation circuit having a third terminal and a fourth terminal, the third terminal coupled between the first and third switch of the class D amplifier and the fourth terminal coupled between the second and fourth switch of the class D amplifier. A battery charging circuit coupled to the third terminal and the fourth terminal.

16 Claims, 7 Drawing Sheets

SPEAKER UTILIZING VOICE COIL FOR WIRELESS CHARGING

BACKGROUND

Technical Field

The present solution relates to a method for utilizing an existing voice coil within a standard speaker to wirelessly charge a battery within the speaker. In particular, the voice coil is bi-directional, with the ability to both produce sound and receive electric charge from a wireless charging power transmission device.

Description of the Related Art

Traditional headphone speakers include a conductive voice coil that is wound around a hollow cylinder and carries an electrical current when in use. When the voice coil is placed within a permanent magnetic field, it moves back and forth due to changes in strength or direction of its electrical current. The voice coil is physically coupled to a speaker cone of the headphones and these movements vibrate the speaker cone. In practice, the rapid movements of the speaker cone create pressure changes in the air, which are audible sound waves.

Conventionally, to charge headphones, a conductive charging plug must be both electrically and physically coupled between the metal circuitry of the headphones and an electrical power outlet.

Wireless charging solutions have also been proposed. Some known types of wireless chargers include a separate low power coil, but these components can cause many complications and are often both expensive and inefficient.

BRIEF SUMMARY

The present disclosure is directed to utilizing existing components in the speaker structure to wirelessly charge the speakers as well as produce sound with the addition of circuitry to enable this bi-directional use. In particular, the present disclosure addresses disadvantages of incorporating a separate low power coil in the headphone circuitry for wireless charging, which increases costs and takes up valuable real estate within the headphone system.

In an embodiment, the present disclosure is directed to a voice coil inside a speaker which is bi-directional and functions both to receive an electrical charge from an external power transmission device and to produce a sound. A class D amplifier, acting as a rectifier, is coupled to a first terminal and a second terminal of the voice coil and to an audio generation circuit. A battery charging circuit is coupled in parallel between the class D amplifier and the sound source. According to an embodiment, the class D amplifier is an H-bridge digital amplifier.

In an alternative embodiment, the coil in the speaker is a middle tap transformer that includes a first terminal, a second terminal, and a third terminal. This coil will produce sound using a first length of the coil between the first and third terminals and will charge the battery with a second length of the coil between the second and third terminals. The second length of coil may be less than the first length of coil.

BRIEF DESCRIPTION OF THE SEVERAL VIEWS OF THE DRAWINGS

The foregoing features and advantages, as well as others, will be described in detail in the following description of specific embodiments given by way of illustration and not limitation with reference to the accompanying drawings, in which.

DETAILED DESCRIPTION

Many electronic devices, such as mobile phones and watches, include a battery. The batteries occasionally need to be recharged. In many cases, this can be accomplished by connecting the electronic device to a power outlet via charging cord. However, in some cases batteries can be charged wirelessly via inductive charging. The electronic device is placed adjacently to a wireless charging device that emits a charging field. Energy harvesting circuitry within the electronic device harvests energy from the charging field. The energy harvesting circuitry may include a rectifier that converts an AC voltage to a DC charging current. The present disclosure is directed to configurations of circuitry for wirelessly chargeable headphones that use the speaker sound generation coil for charging as well.

Figure 1:
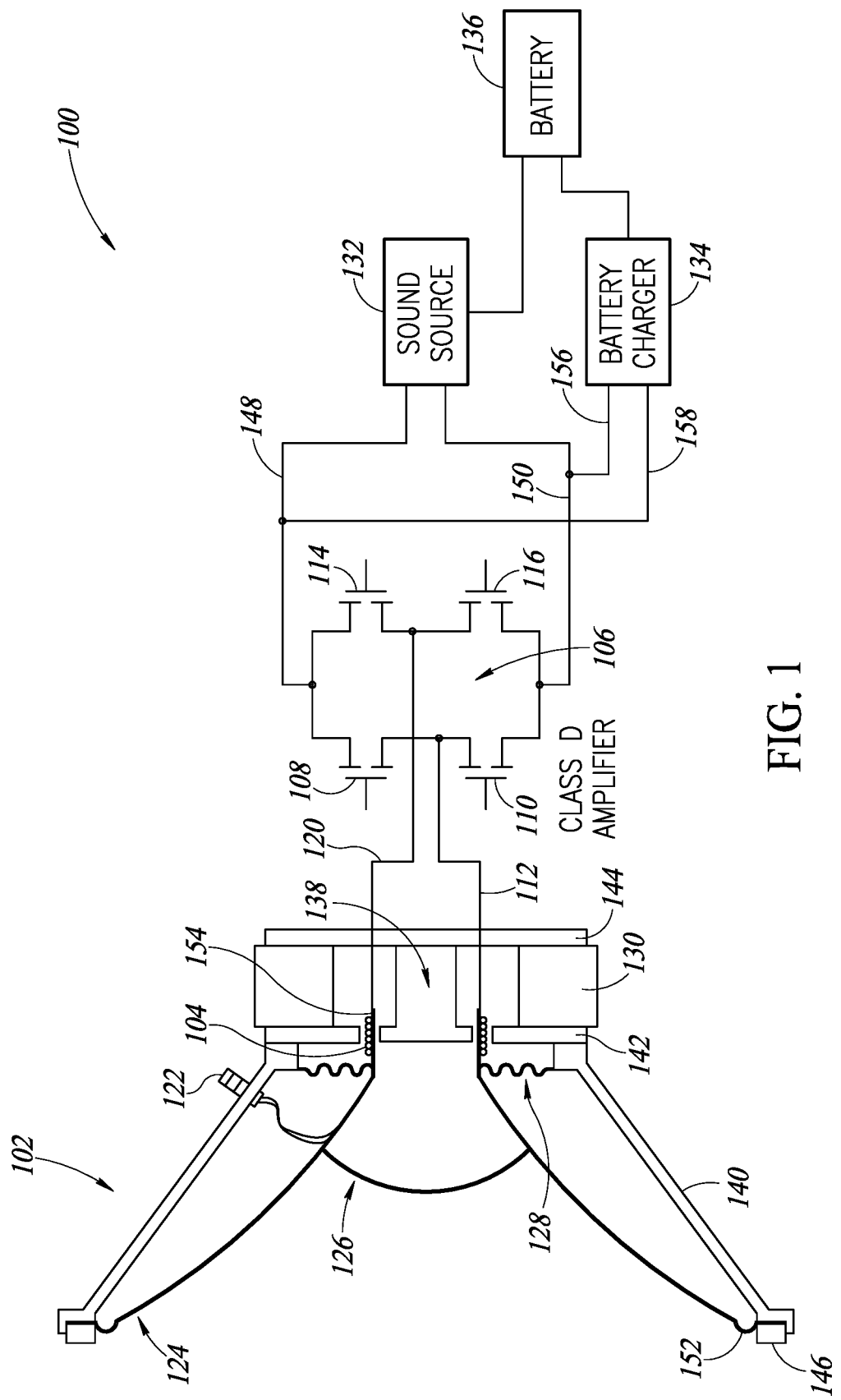
FIG. 1 is a schematic diagram of a speaker in a headphone system and a wirelessly charging circuit according to one embodiment of the present solution.

FIG. 1 is an illustration directed to an embodiment of a headphone speaker system 100 that includes a speaker 102 having a coil 104 configured to operate in a sound generation mode and a battery charging mode using a class D amplifier 106 coupled to the coil 104. The class D amplifier is configured to amplify and rectify based on a sound generation mode or a battery charging mode. The class D amplifier 106 includes a first switch 108 that is coupled to a second switch 110. The term "switch" herein may refer to a transistor or other similar devices capable of amplifying or switching electrical signals. A first terminal 112 of the coil 104 is coupled between the first switch and the second switch 108, 110. The amplifier 106 includes a third switch 114 coupled between a fourth switch 116 and the first switch 108. A second terminal 120 of the coil 104 is coupled between the third and fourth switches 114, 116. Other arrangements of class D amplifiers are envisioned.

The speaker 102 may include a cone 124 that is connected to a rim of a surround suspension 152. The cone 124 encompasses a dust cap 126 that prohibits foreign particles from entering the speaker 102. The coil 104 is positioned on a coil support 154. The coil support 154 is coupled to a spider or interior support 128 on an internal surface of the speaker 102. The spider 128 and the surround suspension 152 holds the cone 124 in place while allowing air vibrations to move the cone 124 in a back and forth motion in response to a magnetic field generated by the coil in the speaker 102.

A magnet 130 is attached between a front plate 142 and a back plate 144 at the base of the speaker 102. The magnet 130 surrounds a pole piece 138 that is positioned between parts of or otherwise surrounded by the coil 104. The magnet 130 and the coil 104 interact together to convert electric energy into mechanical energy or motion. The electric current that is produced through the coil 104 induces a magnetic field. The magnetic field generated by the coil 104 interacts with the magnetic field of the magnet 130 attached to the speaker 102. As audio signals are sent through the coil 104, like magnetic charges continuously repel and opposite charges attract each other by the magnet 130 causing an audio signal. This audio signal enables the cone 124 to oscillate in a back and forth motion, creating pressure waves in the air that is sound.

The surround suspension 152 and cone 124 are attached to a gasket 146. The gasket 146 is mounted to a frame or basket 140 that supports the cone 124, the surround suspension 152, and the dust cap 126. The frame or basket 140 extends from the gasket 146 to the front plate 142. A connection terminal 122 is externally attached to the frame or basket 140, and coupled internally to the cone 124 which provides an electrical connection for external speakers if desired.

The first terminal 112 and the second terminal 120 are coupled to the circuitry that includes the class D amplifier 106 and other elements that are included in the wirelessly chargeable speaker. A third terminal 148 extends from an audio generation circuit or sound source 132 to the class D amplifier 106. The third terminal 148 is coupled between the first and third switch 108, 114. A fourth terminal 150 extends from the audio generation circuit 132 to the class D amplifier 106. The fourth terminal 150 is coupled between the second and fourth switch 110, 116. Audio signals are generated from the audio generation circuit 132 and may consist of audible noise such as a human voice, microphone, Bluetooth device, or any type of playback device which creates sound waves or acoustical energy. The audio generation circuit 132 manipulates the audio signal and passes the audio signal to the class D amplifier 106 using the third and fourth terminal 148, 150.

A battery charging circuit 134 consists of a fifth terminal 156 and a sixth terminal 158. The fifth terminal 156 is coupled to the fourth terminal 150 between the audio generation circuit 132 and the class D amplifier 106. The sixth terminal 158 is coupled to the third terminal 148 between the audio generation circuit 132 and the class D amplifier 106. The battery charging circuit 134 provides direct current to a charge storage device 136. The charge storage device or battery 136 may consist of lithium ion or another suitable alternative to store chemical energy. The charge storage device 136 converts its stored chemical energy into electrical power and passes the power to the audio generation circuit 132 when in the sound generation or audio generation mode. In the battery charging mode, the coil collects energy and transmits that energy through the class D amplifier to the batter charging circuit 134 and to the battery.

Figure 2:
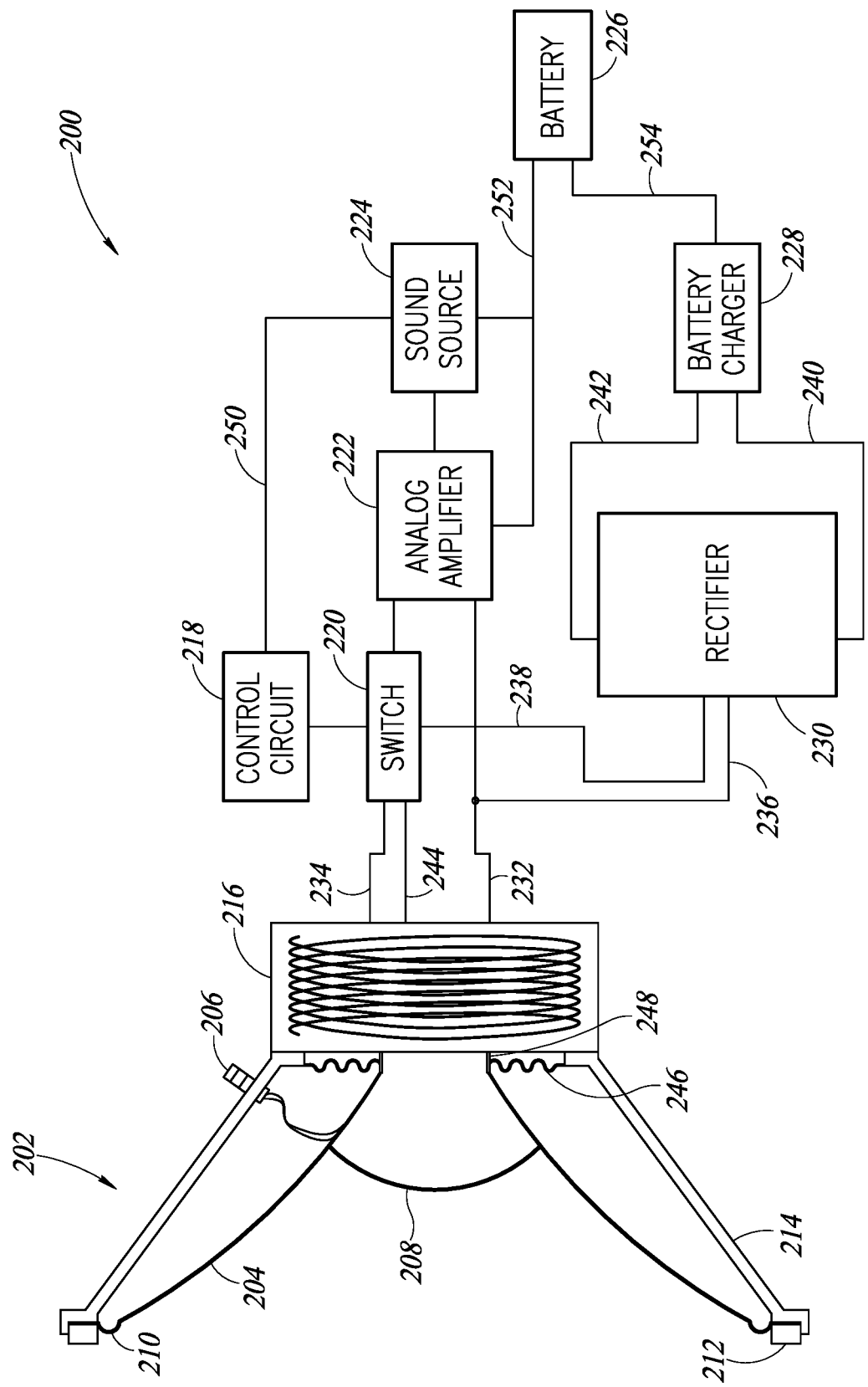
FIG. 2 is a schematic diagram of another example of a speaker in a headphone system and a wirelessly charging circuit having a middle-tap transformer.

FIG. 2 is directed to an alternative embodiment of a speaker and circuitry that has a coil that operates in a sound generation mode and a battery charging mode using a middle tap connection (three terminals on the coil). There are a distinct amplifier and rectifier with a control circuit that manage the switch to change between sound mode and charge mode. In the sound mode, the longer coil is used. In the charge mode, the shorter coil is used.

FIG. 2 is an alternative embodiment of a headphone speaker system 200. The headphone speaker system 200 includes a speaker 202 having a coil 216, a rectifier 230 and an analog amplifier 222. The rectifier and amplifier 230, 222 enable the coil 216 to operate in a sound generation mode and a battery charging mode.

The speaker 202 housing includes a cone 204 that is connected to the rim of a surround suspension 210. The cone 204 encompasses a dust cap 208 that prohibits foreign particles from entering the speaker 202. The surround suspension 210 and cone 204 are attached to a gasket 212. The gasket 212 is mounted to a frame or basket 214 that supports the cone 204, the surround suspension 210, and the dust cap 208. The frame or basket 214 extends from the gasket 212 to the base of the speaker 202 housing the coil 216.

A spider 246 and spider support 248 is coupled to the coil 216. The spider and the surround suspension 210 holds the cone 204 in place while allowing air vibrations to move the cone 204 in a back and forth motion in response to a magnetic field generated by the coil 216 in the speaker 202. A connection terminal 206 is externally attached to the frame or basket 214, and coupled internally to the cone 204 which provides an electrical connection for external speakers if desired.

In the present embodiment, the coil 216 can operate as a sound or audio generation coil and can operate as wireless power charging coil based on a status of the switch or switching circuit 220. The coil 216 has a first terminal 232, a second terminal 234, and a third terminal 244, which is between the first and second terminals. This may be referred to as a middle-tap transformer or coil. In one embodiment, the length of coil between the first and second terminals, 232, 234 is used for sound generation. This length between the first and third terminals is the longest length of the coil. The length of coil between the first terminal 232 and the third terminal 244 is used for wireless charging. The length of coil between the first terminal and the third terminal is less than the length between the first and second terminals.

The first terminal 232 of the coil 216 is coupled to the analog amplifier 222 and the rectifier 230 through a connection 236. The analog amplifier 222 is electrically coupled to the coil 216 through the switch 220. Both the second and third terminals 234, 244 are coupled to the switch 220, which can couple or decouple the second terminal from the analog amplifier and couple or decouple the third terminal from the analog amplifier. The coupling and decoupling is controlled or managed by the control circuit 218.

The sound source 224 is coupled to the analog amplifier 222 and the control circuit 218. The battery 226 is coupled to both the sound source and the analog amplifier through a connection 252. When in use, the analog amplifier reproduces the audio signal at a desired volume and power level and transmits the signal using the first terminal 232.

In sound generation mode, the sound source 224 generates an electric audio signal that is transmitted to the control circuit 218 by a sound source output 250. Once the signal is received, the switch 220 is activated by the control circuit 218 if the control circuit determines to activate the sound generation mode. The control circuit 218 and the switch 220 enable transitioning between the sound generation mode and the battery charging mode by receiving an algorithm that activates or deactivates the second terminal 234 and creates an accurate sound reproduction. In one embodiment, the control circuit switches automatically to the sound generation mode upon receipt of the signal from the sound source circuit 224. The control circuit then activates the switch 220 to couple the second terminal 234 to the analog amplifier so that the largest length of the coil is configured to produce sound. The control circuit may remain in the sound generation mode even if no signal is being transmitted by the sound source. The control circuit may be configured to automatically switch to battery charging mode upon receipt of an induced voltage through the coil and the second terminal 234.

Upon detection of the voltage from the coil, the control circuit can adjust the switch to decouple the second terminal from the analog amplifier and couple the third terminal 244 to the rectifier through connection 238. The third terminal 244 functions as the middle tap transformer coupled to the switch 220, i.e. a shorter version of the coil is coupled to the rectifier in battery charging mode. Said differently, when there is no signal and the coil 216 is receiving inductive energy, the control circuit 218 transmits a signal indicating to switch to a battery charging mode. Inductive charging allows for wireless power transfer through the speaker 202.

In battery charging mode, the rectifier 230 converts the alternating current from the coil 216 to a direct current which is transmitted to a battery charger 228 and to the battery. The terminal 236 from the rectifier 230 is coupled between the coil 216 and the analog amplifier 222. The rectifier 230 transmits the energy to the battery charger 228 through terminals 240, 242. Once the battery device 226 has stored energy, power is supplied to the analog amplifier 222 and the sound source 224 by a battery device terminal 252.

Figure 3:
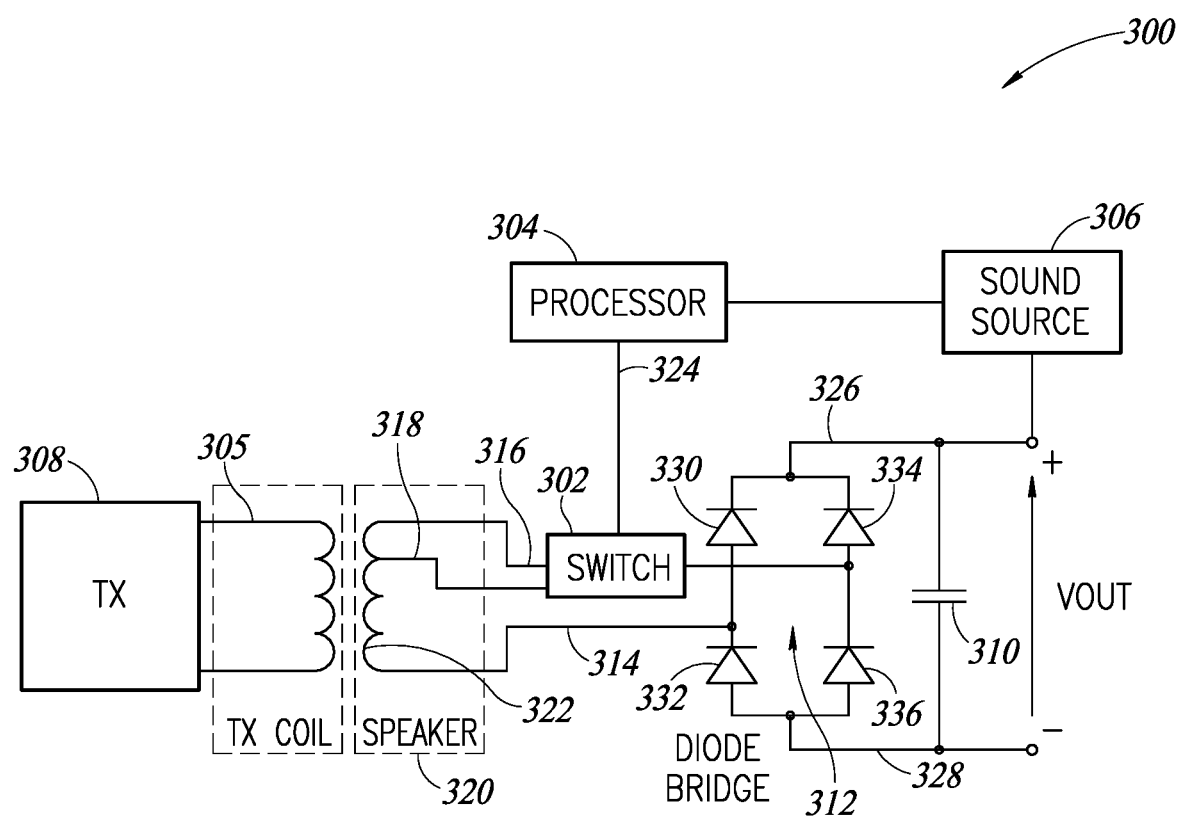
FIG. 3 is a schematic diagram of a speaker in a headphone system, a wirelessly charging circuit, and a charging device according to another embodiment.

FIG. 3 is an alternative embodiment of a speaker with charging circuitry that has a coil that operates in a sound generation mode and a battery charging mode using a middle tap connection (three terminals on the coil). This embodiment includes a class D amplifier that is configured to operate as an amplifier in the sound generation mode and as a rectifier in the battery charging mode with a control circuit that manage the switch to change between sound mode and charge mode.

FIG. 3 is an alternative embodiment of a headphone speaker system 300 having a speaker 320, a coil 322, and a class D amplifier 312 such as those described in respect to FIGS. 1 and 2. The headphone speaker system 300 is configured to interact with a transmitter or transceiver 308 to wirelessly charge a battery (not shown) coupled to the terminals 328, 326. The transceiver 308 includes a coil 305 that transmits an alternative current (AC) signal to the coil 322.

The coil 322 has a first terminal 314, a second terminal 316, and a third terminal 318. In the present embodiment, the coil 322 can operate in a sound or audio generation mode and a wireless battery charging mode using the third terminal 318 as a middle tap transformer.

In the present embodiment, the longer coil is used in the sound or audio generation mode, with the shorter coil used in a wireless battery charging mode. The coil 322 is coupled to the class D amplifier 312. The class D amplifier 312 is used as an amplifier in the sound generation mode and as a rectifier in the battery charging mode. A processor or control circuit 304 receiving a signal from a sound source 306 manages a switch 302 that enables the change between the sound or audio generation mode and the wireless battery charging mode.

The class D amplifier and rectifier 312 may include a first diode 330 that is coupled to a second diode 332. The first terminal 314 of the coil 322 is coupled between the first diode and the second diode 330, 332. The class D amplifier 312 includes a third diode 334 coupled between a fourth diode 336 and the first diode 330. The second terminal 316 of the coil 322 is coupled between the third and fourth diodes 334, 336.

A sound source terminal 326 is coupled to the class D amplifier 312 between the first diode 330 and third diode 334. A negative voltage terminal 328 is coupled to the class D amplifier between the second diode 332 and the fourth diode 336. A capacitor 310 is coupled between the sound source terminal 326 and the negative voltage terminal 328.

Figure 4:
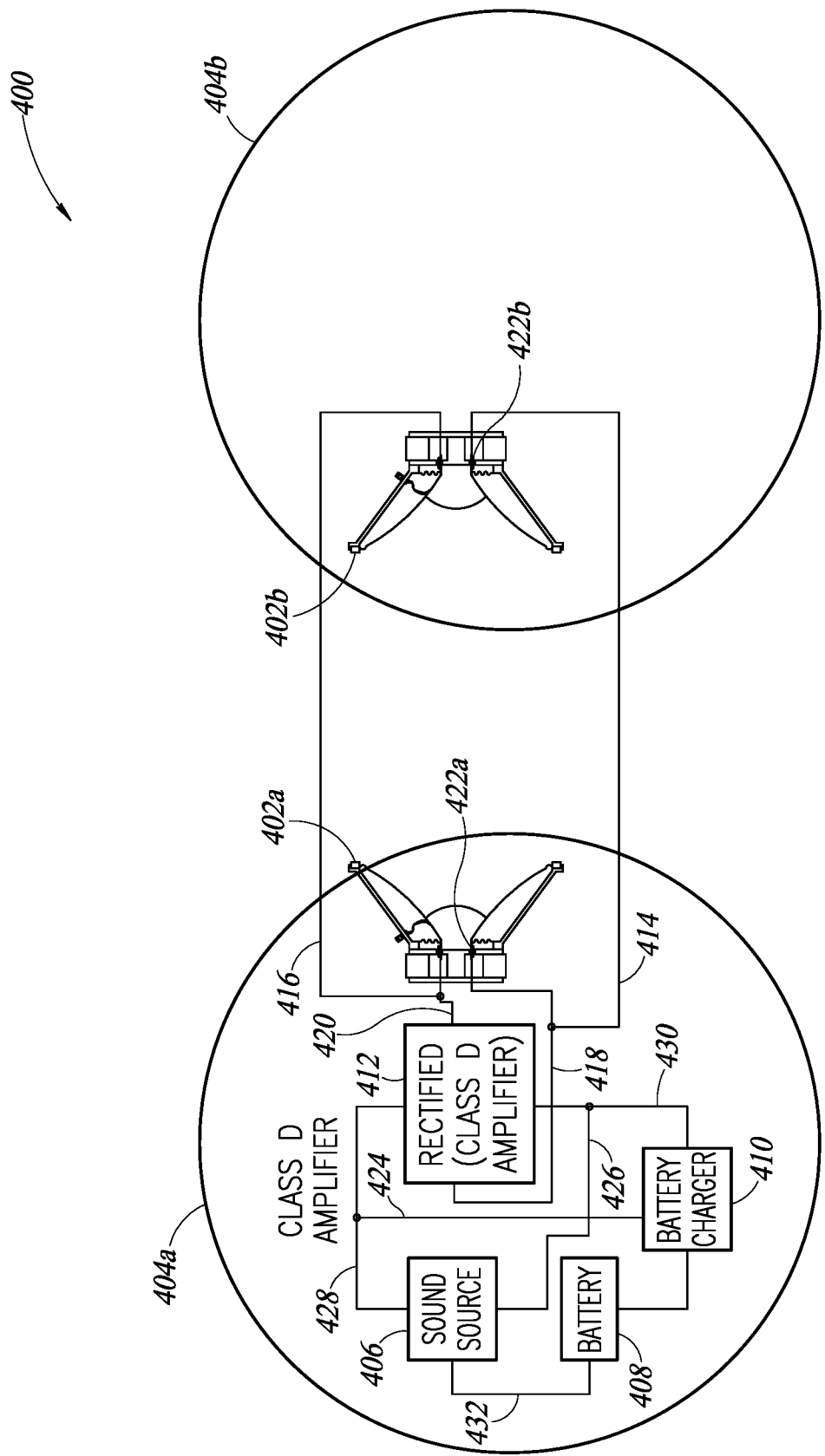
FIG. 4 is a schematic diagram of integration of the wirelessly charging circuit of FIG. 1 in a pair of headphones according to an embodiment.

FIG. 4 is a schematic illustration of an alternative embodiment of the wirelessly charging circuit as described in FIG. 1 integrated within a headphone speaker system 400. The headphone speaker system 400 includes a first headphone 404a having a first speaker 402a, and a second headphone 404b having a second speaker 402b. Each speaker in the headphone phone system 400 is comprised of the components as described in FIGS. 1-3, such as having a speaker with a coil that can be used to operate in a sound generation mode and a battery charging mode.

The headphone speaker system may have a rigid band or curved structure that physically couples the first headphone to the second headphone. The rigid band may be a head band with a rigid structure and a cushion structure to be between a user's head and the rigid structure. Electrical connections 414, 416 may be physically within or coupled to the rigid structure. Alternatively, the headphone speaker system may have a flexible wire between the first and second headphone to electrically and physically couple them together, such as through a first connection 414 and a second connection 416.

The headphone system can be wirelessly charged through components in one of the speakers. For example, the first headphone 404a includes the circuitry to achieve wireless inductive charging. A voice coil 422a in the first speaker 402a of the first headphone 404a includes a first terminal 418 and a second terminal 420. The first and second terminals 418, 420 extend from the voice coil 422a to a class D amplifier 412 that is configured to be an amplifier in a first mode and a rectifier in a second mode.

The single class D amplifier 412 is coupled to both of the first and second speakers 402a, 402b by the first connection 414 and the second connection 416. The first and second connection 414, 416 are coupled to the first coil 422a in the first speaker 402a and a second coil 422b in the second speaker 404b. The first connection 414 is coupled to the first terminal 418 between the first speaker 402a and the class D amplifier 412. The second connection 416 is coupled to the second terminal 420 between the first speaker 402a and the class D amplifier 412. Both coils 422a, 422b may be placed adjacent to a transmitter or transceiver charging pad to receive the AC signal to charge a battery 408.

A third terminal 428 extends from an audio generation circuit or sound source 406 to the class D amplifier 412. A battery charging circuit 410 consists of a fourth terminal 430 and a fifth terminal 424. The fourth terminal 430 extends from the battery charging circuit 410 to the class D amplifier 412. The fifth terminal 424 extending from the battery charging circuit 410 is coupled between the class D amplifier 412 and the audio generation circuit or sound source 406. A sound source terminal 426 extending from the audio generation circuit or sound source 406 is coupled between the battery charging circuit 410 and the class D amplifier 412.

The battery charging circuit 410 provides direct current to a charge storage device 408. The charge storage device 408 may be comprised of lithium ion or another suitable alternative to store energy. The charge storage device 408 converts its stored chemical energy into electrical power and passes the power to the audio generation circuit 406 by a battery charging terminal 432 when in sound or audio generation mode.

The headphone system 400 includes the first and second coil 422a, 422b, which are coupled to a single sound generation and battery charging circuit. Each of the coils are configured to transmit sound and receive a charging signal. There is a single class D amplifier that acts as both an amplifier and rectifier depending on whether the system is in sound production mode or in a battery charging mode. This provides a cost effective circuitry that can automatically switch between the two modes based on use detected by whether the sound source is transmitting a signal or if the headphone system is in a resting state with no signal being emitted from the sound source. The system may include a sensor, such as an accelerometer or gyroscope to detect and identify when the headphones are not on the user and are resting on a charging pad. The system may also automatically identify that a signal is being received by one of the coils, and by way of example and without any limitation, the system may detect which of the coils is receiving the stronger signal and select that coil to receive the charging signal for example, with a microprocessor or controller (not shown) coupled to the other circuitry in the headphones.

Figure 5:
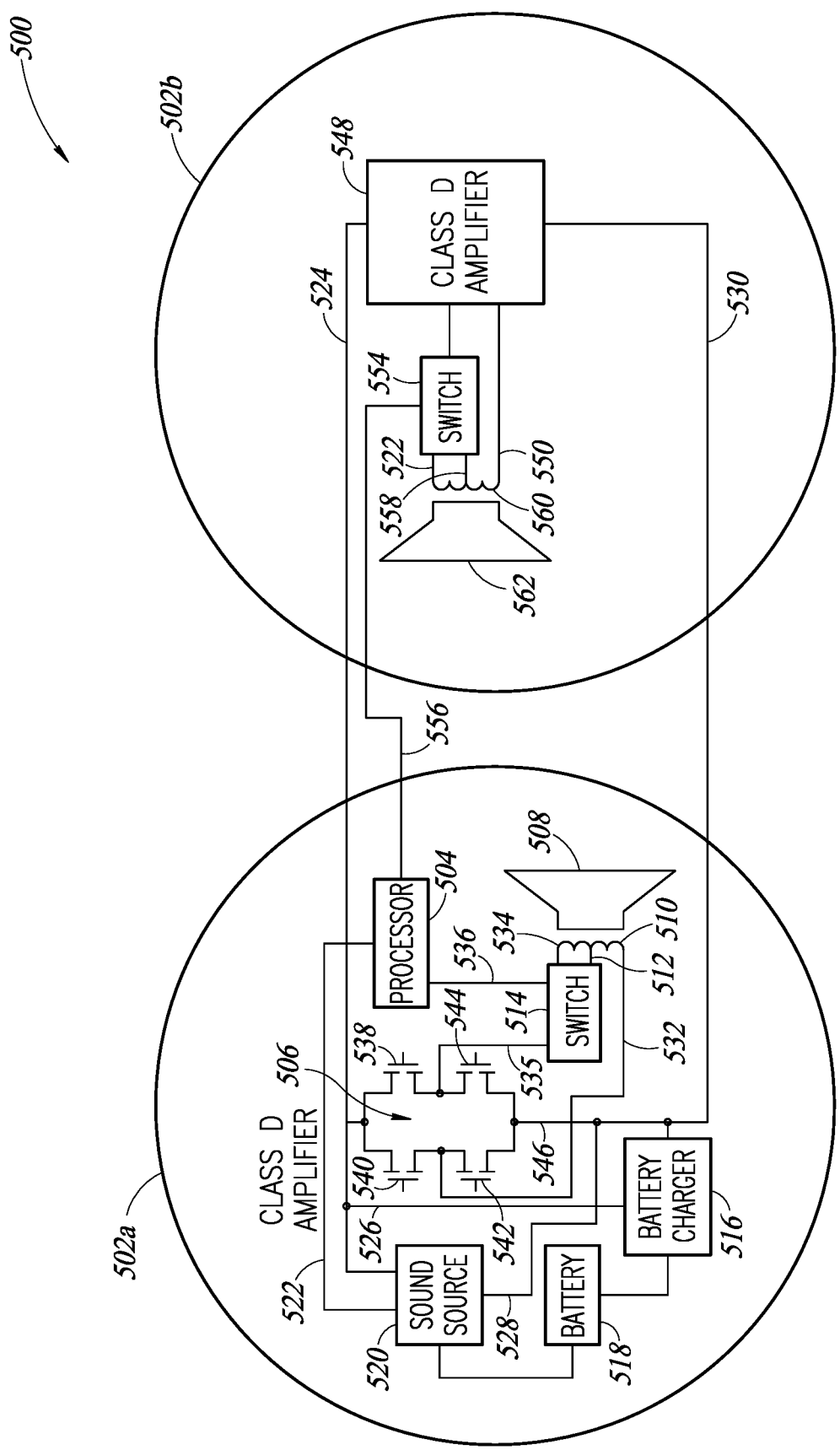
FIG. 5 is a schematic illustration of integration of the wirelessly charging circuit of FIG. 3 in a pair of headphones according to an embodiment.

FIG. 5 is a schematic illustration of an alternative embodiment of the wireless charging and sound generation circuit as described in FIG. 3, integrated within a headphone speaker system 500. The headphone speaker system 500 includes a first headphone 502a having a first speaker 508, and a second headphone 502b having a second speaker 562. In the first headphone 502a, the speaker 508 includes a coil 510 having a first terminal 532, a second terminal 534, and a third terminal 512, which is between the first and second terminals 532, 534 and serves as a middle tap transformer. The first terminal 532 extends from the coil 510 to a class D amplifier 506. A processor 504 receiving a signal from a sound source 520 manages a switch 514 that enables the change between the sound or audio generation mode and the wireless battery charging mode.

In one embodiment, the class D amplifier 506 includes a first switch 540 that is coupled to a second switch 542. The first terminal 532 is coupled between the first and second switch 540, 542. The amplifier 506 includes a third switch 538 coupled between a fourth switch 544 and the first switch 540. The second terminal 534 of the coil is coupled to the switch 514, which is coupled between the third and fourth switches 538, 544 with a connection 535.

The sound source 520 is coupled to a battery charger connection 546 that extends from a battery charger 516 to the class D amplifier 506. The battery charger connection 546 is coupled between the second and fourth switches 542, 544. The sound source 520 in the first headphone 502a is coupled to a second class D amplifier 548 in the second headphone 502b using a first headphone terminal 524. The processor 504 in the first headphone is coupled to a second switch 554 in the second headphone. In the second headphone 502b, the speaker 562 includes a coil 560 having a first terminal 550, a second terminal 552, and a third terminal 558 coupled to a switch 554. The first terminal 550 is coupled to the class D amplifier 548.

The class D amplifier 548 is electrically coupled to the coil 560 through the switch 554. Both the second and third terminals 552, 558 are coupled to the switch 554, which can couple or decouple the second terminal from the class D amplifier 548 and couple or decouple the third terminal from the class D amplifier. The coupling and decoupling is controlled or managed by the processor 504 in the first headphone 502a. The class D amplifier 548 is coupled to the battery charger connection 546 in the first headphone 502a by a second headphone terminal 530.

This headphone system 500 includes two speakers and two middle tap transformer coils that are coupled to sound generation circuitry and wireless charging circuitry that minimizes the circuit elements for operation in these dual modes. There is a single processor that receives signals from the single sound source 520. Each speaker is coupled to a different switch or switching circuitry to manage the change from sound mode, using the full coil, to charging mode, using a portion of the coil (a smaller length of coil than the sound mode). This allows either headphone coil to act as a charge receiving coil so that a user does not have to determine which one of the headphones is appropriate for placing on a wireless charging pad. Each of the headphones also includes a class D amplifier that can both receive the AC charging signal from the charging pad and produce or generate sound signals when in sound generation mode.

Figure 6:
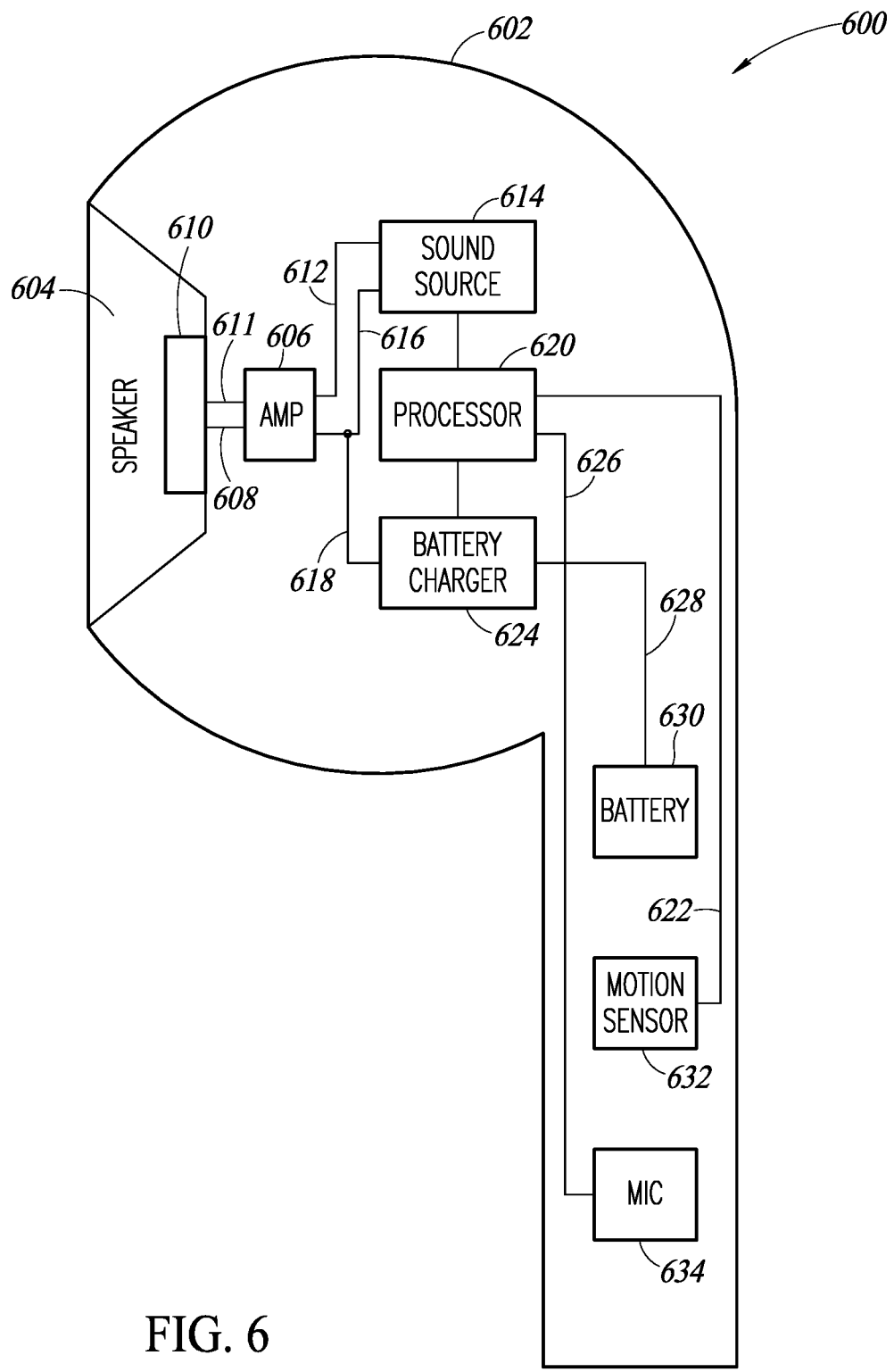
FIG. 6 is a cross-section view of a wireless headphone with a block diagram including a wirelessly charging circuit according to an embodiment.

FIG. 6 is a schematic illustration of an alternative embodiment of a wireless earbud system 600 integrated with wireless charging circuitry. Each wireless earbud 602 in the wireless earbud system 600 may contain the wirelessly charging circuit as described in FIGS. 1-3, such as enabling the wireless earbud 602 to operate in a sound generation mode and a battery charging mode. In this alternative embodiment, the wireless earbud 602 includes a speaker 604 having a coil 610, an amplifier 606, and a processor 620. The coil 610 has terminals 608, 611 coupled to the amplifier 606. The amplifier 606 is coupled to a sound source circuit 614 by a first sound terminal 612.

In the present embodiment, a motion sensor or accelerometer 632 is integrated within the wirelessly charging circuit to detect movement, sense gestures, or optical sensors to detect when the wireless earbud 602 has been inserted in or out of the ear. For example, the motion sensor or accelerometer 632 can enable the wireless earbud 602 to detect when in a resting state and begin to search for a transmitting signal to charge a battery 630. Once the change in state is detected, the motion sensor or accelerometer 632 transmits a signal by a motion sensor terminal or output 622 to the processor 620. The processer 620 then triggers a stop in sound generation mode and triggers the battery charging mode. A battery charging connection 618 is coupled to a second sound source terminal 616 enables the sound source indicator 614 to receive a signal from a battery charger 624. The battery charger 624 receives the signal from the processor 620 to begin charging the battery 630 using a battery terminal 628.

A microphone 634 is coupled to the processor 620 by a microphone terminal 626. The microphone 634 recognizes speech from the user and transmits a signal to the processor 620 triggering a switch from battery charging mode to sound generation mode by the sound source indicator 614.

The coil 610 may be a single coil or may be a middle tap transformer configuration as discussed in other embodiments. The system in the earbud can change from a wireless charging mode to a sound generation mode based on the detected signals from the motion sensor alone or in combination with the microphone and sound source. For example, if the sound source is outputting a sound signal, the amplifier (a class D amplifier that can act as an amplifier and a rectifier) will be in amplifier mode. In reaction to either the sound source not outputting a sound signal, the microphone not receiving an audio or sound signal, or the motion sensor not detecting motion, the processor can switch to the rectifier mode to receive a charge inductively with the coil 610.

Figure 7A:
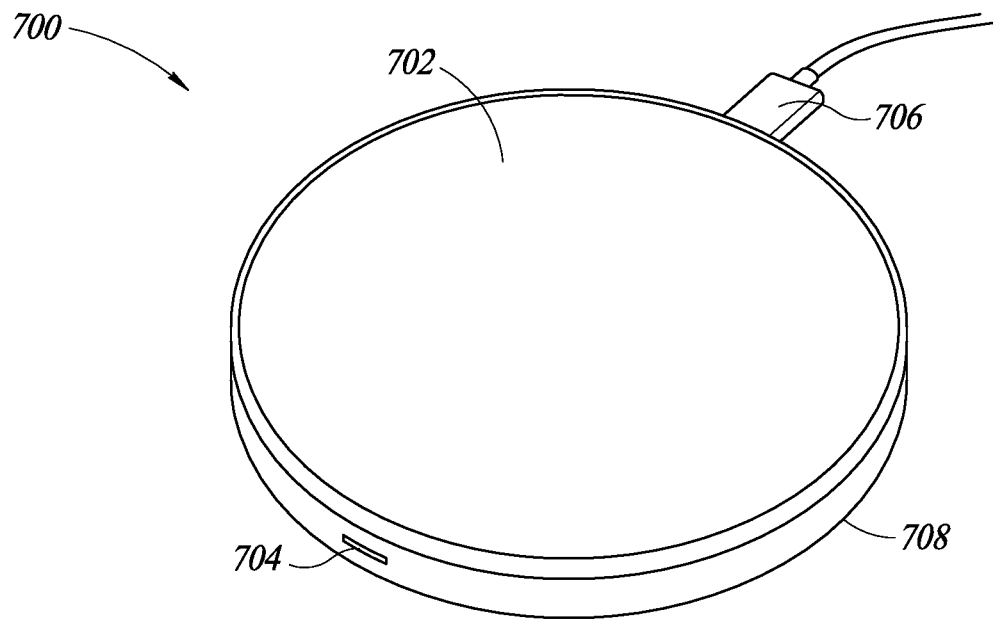
FIGS. 7A and 7B illustrate a method and system of wirelessly charging headphones on a charging pad according to an embodiment.

FIG. 7A is an illustration of a wireless charging system 700. The wireless charging system 700 includes a wireless charging mat or pad 702 that can be utilized to charge any wireless headphone system, including the wireless headphone systems as described in FIGS. 1-6. Within the wireless charging mat 702, a coil 708 is integrated within the receiver to enable inductive coupling. The wireless charging mat 702 is equipped with a cable 706 and a LED indicator light 704. If plugged into an electrical outlet, the LED indicator light 704 will illuminate to indicate whether the wireless headphone system is charging or has completed charging.

Figure 7B:
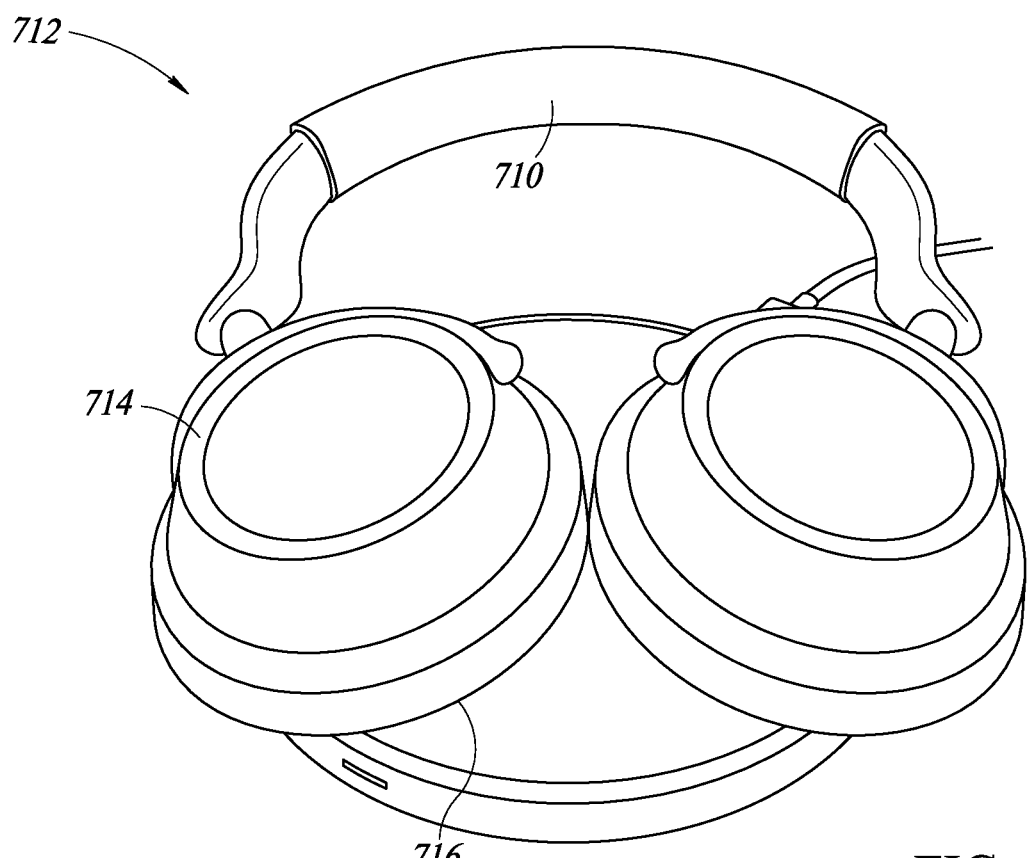

FIG. 7B is an illustration of a wireless headphone system 712 charging on the wireless charging system 700. A headphone system 710 can be placed on the wireless charging mat 702 as described in FIG. 7A. A headphone housing 714 is placed on the wireless charging mat in a position that allows inductive charging through the coil of a wireless headphone speaker 716. When the wireless headphone speaker 716 is placed on the wireless charging mat 702, the processor or processing unit within the wireless charging circuitry detects a measurement that indicates which speaker coil to implement for battery charging mode.

Embodiments of the present disclosure include a speaker with a voice or sound coil that is a conductive wire, which may be copper or aluminum or other suitable metal alloy. A class D amplifier may be directly coupled to the speaker via the voice coil. The class D amplifier may include an H-bridge circuit having a first switch, such as a MOSFET, a second switch coupled in series with the first switch, a third switch coupled in parallel with the first and second switches, and a fourth switch coupled in series with the third switch and coupled in parallel with the first and second switches. A processor that is coupled to gates of the first switch, second switch, third switch, and fourth switch of the class D amplifier. A sound source that is coupled to the first switch, second switch, third switch, and fourth switch of the class D amplifier. A battery charger is coupled in parallel between the sound source and the class D amplifier, the battery charger being charged by the class D amplifier. A battery may be directly coupled to the sound source and to the battery charger.

Embodiments may also include a system having a speaker including a back plate that is metal, the back plate being in the shape of a flat cylinder, a front plate that is metal and situated in parallel to the back plate, the front plate being in the shape of a flat toroid, a magnet physically coupled between the front plate and the back plate that is toroidal in shape with an inner radius that is greater than an internal radius of the front plate. The speaker may include a pole piece that is magnetic and physically coupled to the back plate, the pole piece having a cylindrical shape and being positioned concentrically within a hole in the magnet and within a hole in the front plate such that it is separated from an internal surface of the magnet and an internal surface of the front plate by a narrow gap of air. A basket that is in the shape of a conical frustum with a smaller circular opening is physically coupled to the outer pole piece, the basket being a metal frame. A speaker cone that is made of a stiff but lightweight material, the speaker cone being in the shape of a conical frustum with a smaller circular opening being physically coupled to the front plate.

The speaker may include a gasket that is a thin ring attached to an outer rim on the basket to connect the speaker to an external enclosure, the gasket being made of rubber or another sealant material. A surround that is attached to both the speaker cone and the basket, the surround being a thin ring made of foam, rubber, or another flexible material. A spider that is a ring of rubber type material with coaxial ripples, the spider having an outer edge that is attached to the smaller circular opening of the basket and an inner edge. A voice coil that is thin-walled and cylindrical, the voice coil being positioned such that one end is suspended in the air gap between the pole piece and the internal surface of the front plate.

A dust cap may be included that is physically attached to the speaker cone in either a concave or convex orientation, the dust cap being made of a thin material, possibly fabric or aluminum, and circular in shape. A sound source circuit is coupled to the coil and the processor. A connection terminal that is located on the basket and is electronically coupled to the voice coil, the connection terminal providing a point of electronic connection from the voice coil to a component outside the basket. An amplifier is electronically connected in parallel to the voice coil, the amplifier being used to amplify audio signals from a sound source. A rectifier is coupled in parallel to the voice coil. A battery charger is coupled in parallel to the rectifier. A charge storage device that is electronically coupled to both the battery charger and the sound source. A power transmission device such as a charging plate electrically coupled to the battery charger in the speaker, the power transmission device being placed in the larger circular opening of the basket.

Embodiments include a device having a headphone speaker that includes: a coil having a first terminal, a second terminal, and a third terminal; a switching circuit coupled to the first terminal and the second terminal of the coil; a rectifier coupled to the third terminal and the switching circuit; an amplifier coupled to the switching circuit and the third terminal; an audio generation circuit coupled to the amplifier; and a battery charging circuit coupled to the rectifier.

A housing that includes the headphone speaker, the switching circuit, the rectifier, the amplifier, the audio generation circuit, and the battery charging circuit is included. The coil is configured to output an acoustic signal in a first sound generation mode and is configured to receive a charge in a second battery charging mode. The first terminal and the third terminal of the coil are utilized during the first sound generation mode and the second terminal and the third terminal of the coil are utilized during the second battery charging mode.

A first length of the coil between the first terminal and the third terminal is greater than a second length of the coil between the second terminal and the third terminal. The switching circuit is configured to switch between the first sound generation mode and the second battery charging mode. A control circuit that is configured to receive a sound generation signal from the audio generation circuit and transit a first mode activation signal.

Embodiments also include a device that includes a headphone speaker housing that having a coil having a first terminal and a second terminal; a class D amplifier circuit that is configured to rectify in a battery charging mode and amplify in a sound generation mode, the class D amplifier is coupled to the first terminal and the second terminal of the coil, the class D amplifier including: a first, second, third, and fourth switch, the first terminal coupled between the first and second switch, the second terminal coupled between the third and fourth switch. An audio generation circuit having a third terminal and a fourth terminal, the third terminal coupled between the first and third switch of the class D amplifier and the fourth terminal coupled between the second and fourth switch of the class D amplifier. A battery charging circuit coupled to the third terminal and the fourth terminal.

The class D amplifier is configured to synchronously rectify in the battery charging mode. A switching circuit coupled between the coil and the class D amplifier, the coil includes a third terminal that is coupled to the switching circuit, the second terminal is coupled to the switching circuit.

A method includes generating a sound signal in an audio generation circuit in a sound generation mode, the sound generation mode including: amplifying the sound signal through an amplifier, the amplifier coupled to the audio generation circuit; creating audible sound waves with a coil in a speaker with a first terminal and a second terminal, the first terminal and the second terminal being coupled to the amplifier; switching to a battery charging mode, the battery charging mode including: receiving with the second terminal and a third terminal of the coil of the speaker a wireless AC charge current; converting the wireless AC charge current into a DC charge current via a rectifier, the rectifier being coupled to the speaker; wirelessly charging a charge storage device by transferring the DC charge current from the rectifier to a battery charger circuit, the battery charger circuit being coupled to the rectifier.

The method includes switching between the sound generation mode and the battery charging mode by activating a switch coupled between the amplifier and the speaker. The method also includes automatically switching from the battery charging mode to the sound generation mode in response to an output signal from the audio generation circuit. The amplifier and the rectifier are implemented with a class D amplifier. A first length of coil between the first and second terminals is greater than a second length of coil between the second and third terminals.

The method includes detecting the proximity of the external power transmission device; and switching between a sound generation mode and a battery charging mode based on proximity of the external power transmission device.

Alternative embodiments of the present disclosure may include, but are not limited to, two speakers. In such embodiments, the wireless charging system may include two or more speakers in which case the wireless charging system could select the optimum speaker for battery charging mode.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
    a headphone speaker that includes:
        a voice coil having a first terminal, a second terminal, and a third terminal;
        a switching circuit coupled to the first terminal and the second terminal of the voice coil;
        an amplifier coupled to the switching circuit and the third terminal, the amplifier including:
            a first, second, third, and fourth transistor, the switching circuit coupled between a source/drain of the first transistor and a source/drain of the second transistor, the third terminal coupled between a source/drain of the third transistor and a source/drain of the fourth transistor;
        an audio generation circuit coupled between a source/drain of the first transistor and a source/drain of the third transistor of the amplifier and between a source/drain of the second transistor and a source/drain of the fourth transistor of the amplifier;
        a battery charging circuit coupled to the amplifier; and
        a processor coupled between the audio generation circuit and the switching circuit, the processor being coupled to a first gate of the first transistor, a second gate of the second transistor, a third gate of the third transistor, and a fourth gate of the fourth transistor.

2. The device of claim 1, comprising a housing that includes the headphone speaker, the switching circuit, the amplifier, the audio generation circuit, and the battery charging circuit.

3. The device of claim 1 wherein the voice coil is configured to output an acoustic signal in a first sound generation mode and is configured to receive a charge in a second battery charging mode.

4. The device of claim 3 wherein the first terminal and the third terminal of the voice coil are utilized during the first sound generation mode and the second terminal and the third terminal of the voice coil are utilized during the second battery charging mode.

5. The device of claim 4 wherein a first length of the voice coil between the first terminal and the third terminal is greater than a second length of the voice coil between the second terminal and the third terminal.

6. The device of claim 5 wherein the switching circuit is configured to switch between the first sound generation mode and the second battery charging mode.

7. The device of claim 6, comprising a control circuit that is configured to receive a sound generation signal from the audio generation circuit and transit a first mode activation signal.

8. A device, comprising:
    a first headphone speaker housing that includes:
        a first coil having a first terminal and a second terminal;
        a first class D amplifier circuit that is configured to rectify in a battery charging mode and amplify in a sound generation mode, the class D amplifier is coupled to the first terminal and the second terminal of the coil, the class D amplifier including:
            a first, second, third, and fourth transistor, the first terminal coupled between a source/drain of the first transistor and a source/drain of the second transistor, the second terminal coupled between a source/drain of the third transistor and a source/drain of the fourth transistor;
        an audio generation circuit having a third terminal and a fourth terminal, the third terminal coupled between a source/drain of the first transistor and a source/drain of the third transistor of the class D amplifier and the fourth terminal coupled between a source/drain of the second transistor and a source/drain of the fourth transistor of the class D amplifier, the audio generation circuit configured to generate an audio signal and transmit the audio signal to the class D amplifier in the sound generation mode; and
        a battery charging circuit coupled to the third terminal and the fourth terminal, the battery charging circuit configured to receive energy from the coil in the battery charging mode; and a second headphone speaker housing that includes:
  a second coil; and
  a second class D amplifier coupled to the second coil, to the audio generation circuit, and the battery.

9. The device of claim 8 wherein the class D amplifier is configured to synchronously rectify in the battery charging mode.

10. The device of claim 8, comprising a switching circuit coupled between the coil and the class D amplifier, the coil includes a third terminal that is coupled to the switching circuit, the second terminal is coupled to the switching circuit.

11. A method, comprising:
  generating a sound signal in an audio generation circuit in a sound generation mode, the sound generation mode including:
    amplifying the sound signal through an amplifier, the amplifier coupled to the audio generation circuit, the amplifier including:
      a first, second, third, and fourth transistor;
    creating audible sound waves with a coil in a speaker with a first terminal and a second terminal, the first terminal and the second terminal being coupled to the amplifier, the first terminal coupled between a source/drain of the first transistor and a source/drain of the second transistor, the second terminal coupled between a source/drain of the third transistor and a source/drain of the fourth transistor,
    wherein the audio generation circuit has a third terminal and a fourth terminal, the third terminal coupled between a source/drain of the source/drain of the first transistor and a source/drain of the second transistor, the second terminal coupled between a source/drain of the third transistor and a source/drain of the fourth transistor; and switching to a battery charging mode via a control circuit activating a switching circuit coupled between the amplifier and the speaker, the control circuit coupled between the switching circuit and the audio generation circuit, the battery charging mode including:
    receiving with the second terminal and a third terminal of the coil of the speaker a wireless AC charge current;
    converting the wireless AC charge current into a DC charge current via a rectifier, the rectifier being coupled to the speaker; and
    wirelessly charging a charge storage device by transferring the DC charge current from the rectifier to a battery charger circuit, the battery charger circuit being coupled to the rectifier.

12. The method of claim 11 wherein the switching between the sound generation mode and the battery charging mode by activating the switching circuit includes coupling and decoupling the second terminal from the amplifier.

13. The method of claim 11, comprising automatically switching from the battery charging mode to the sound generation mode in response to an output signal from the audio generation circuit.

14. The method of claim 11 wherein the amplifier and the rectifier are implemented with a class D amplifier.

15. The method of claim 11 wherein a first length of coil between the first and second terminals is greater than a second length of coil between the second and third terminals.

16. The method of claim 11, comprising:
  detecting the proximity of an external power transmission device; and
  switching between a sound generation mode and a battery charging mode based on proximity of the external power transmission device.

* * * * *